US011248683B2

(12) United States Patent
Miyata et al.

(10) Patent No.: US 11,248,683 B2
(45) Date of Patent: Feb. 15, 2022

(54) TRANSMISSION AND COMPRESSOR SYSTEM

(71) Applicant: MITSUBISHI HEAVY INDUSTRIES COMPRESSOR CORPORATION, Tokyo (JP)

(72) Inventors: Hiroyuki Miyata, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 17/143,523

(22) Filed: Jan. 7, 2021

(65) Prior Publication Data
US 2021/0215234 A1    Jul. 15, 2021

(30) Foreign Application Priority Data

Jan. 9, 2020  (JP) .............................. JP2020-002441

(51) Int. Cl.
*F16H 13/08*        (2006.01)
*F16H 57/08*        (2006.01)

(52) U.S. Cl.
CPC ............. *F16H 13/08* (2013.01); *F16H 57/08* (2013.01); *F16H 2057/085* (2013.01)

(58) Field of Classification Search
CPC .... F16H 13/08; F16H 57/08; F16H 2057/085; F16H 13/00; F16H 13/02; F16H 13/04
See application file for complete search history.

(56) References Cited

U.S. PATENT DOCUMENTS

| 1,575,252 | A | * | 3/1926 | Carter | ..................... F16H 13/00 475/183 |
| 3,848,476 | A | * | 11/1974 | Kraus | ..................... F16H 13/04 476/70 |
| 3,945,270 | A | * | 3/1976 | Nelson | ..................... F16H 13/04 476/61 |
| 4,408,503 | A | * | 10/1983 | Kraus | ..................... F16H 13/04 476/65 |

(Continued)

FOREIGN PATENT DOCUMENTS

| EP | 1426658 | A2 | * | 6/2004 | ............. | F16H 13/14 |
| GB | 1090135 | A  | * | 11/1967 | ............. | F16H 13/00 |

(Continued)

*Primary Examiner* — Sherry L Estremsky
(74) *Attorney, Agent, or Firm* — Osha Bergman Watanabe & Burton LLP

(57) ABSTRACT

A transmission includes a first shaft which is rotatably supported by a first radial bearing, a ring member which is connected to an end portion of the first shaft, a sun roller which is disposed inside the ring member in a radial direction, a second shaft which extends from the sun roller, a plurality of planetary rollers which are disposed in a state of being in contact with an inner peripheral surface of the ring member and an outer peripheral surface of the sun roller, and a planetary roller supporting member which rotatably supports the planetary roller and restrains a movement of the planetary roller in the circumferential direction, in which the ring member is in contact with the plurality of planetary rollers in a state of pressing the plurality of planetary rollers inward in the radial direction so that the plurality of planetary rollers face the sun roller.

6 Claims, 4 Drawing Sheets

(56) References Cited

U.S. PATENT DOCUMENTS

| | | | | |
|---|---|---|---|---|
| 5,931,759 | A | * | 8/1999 | Otaki ...................... F16H 13/06 |
| | | | | 475/195 |
| 6,554,730 | B1 | * | 4/2003 | Sakai ...................... B62M 6/55 |
| | | | | 180/206.4 |
| 6,796,126 | B2 | * | 9/2004 | Hasegawa ............... F01D 5/026 |
| | | | | 123/559.1 |
| 10,250,101 | B2 | * | 4/2019 | Brassitos ................. H02K 9/10 |
| 2017/0276144 | A1 | * | 9/2017 | Fukuyama .............. F04D 25/06 |

FOREIGN PATENT DOCUMENTS

| JP | S63-047554 A | 2/1988 |
|---|---|---|
| JP | H9-112642 A | 5/1997 |

\* cited by examiner

TRANSMISSION AND COMPRESSOR SYSTEM

BACKGROUND OF THE INVENTION

Field of the Invention

The present disclosure relates to a transmission and a compressor system.

Priority is claimed on Japanese Patent Application No. 2020-002441, filed on Jan. 9, 2020, the content of which is incorporated herein by reference.

Description of Related Art

Japanese Unexamined Patent Application, First Publication No. H9-112642 discloses a configuration of a planetary roller type power transmission device in which a plurality of planetary rollers are disposed between an inner peripheral surface of an outer ring disposed concentrically and a sun roller, and a carrier supporting a support shaft of the planetary roller is used as an output shaft. In this configuration, lubricating oil is supplied to a contact portion between the planetary roller and the outer ring.

SUMMARY OF THE INVENTION

However, in the above configuration, a lubricating oil supply mechanism for supplying the lubricating oil to the contact portion between the planetary roller and the outer ring or a bearing which rotatably supports the outer ring and the carrier is required. Therefore, in order to use the planetary roller type power transmission device for a long period of time, maintenance such as supplying the lubricating oil to the lubricating oil supply mechanism is required, which is troublesome.

Further, if a rotation speed increases to support a high-speed operation, the lubricating oil may flow outward in a circumferential direction due to a centrifugal force, and thus, lubricity may be impaired. Further, when a temperature of the lubricating oil increase, the lubricity is impaired, and thus, a rotational speed may be limited.

The present disclosure provides a transmission and a compressor system capable of suppressing a use of lubricating oil, facilitating maintenance, and increasing a rotation speed.

According to an aspect of the present disclosure, a transmission is provided including: a housing, a first radial bearing which is dry-type and is fixed to the housing; a first shaft which is supported by the first radial bearing to be rotatable around an axis with respect to the housing; a ring member which is accommodated inside the housing, has a cylindrical shape extending axial direction in which the axis extends, and is connected to an end portion of the first shaft so as to rotate around the axis together with the first shaft; a second radial bearing which is dry-type and is fixed to the housing on a side opposite to the first radial bearing in the axial direction in a state where the ring member is interposed therebetween; a sun roller which is disposed inside the ring member in a radial direction about the axis and has a columnar shape about the axis; a second shaft which extends from the sun roller to a first side in the axial direction and is rotatably supported around the axis by the second radial bearing; a plurality of planetary rollers which formed in a columnar shape and are disposed at intervals in a circumferential direction around the axis in a state of being in contact with an inner peripheral surface of the ring member and an outer peripheral surface of the sun roller; and a planetary roller supporting member which rotatably supports each of the plurality of planetary rollers around a roller axis of each of the plurality of planetary rollers and restrains a movement of each of the plurality of planetary rollers in the circumferential direction, in which the ring member is in contact with the plurality of planetary rollers in a state of pressing the plurality of planetary rollers inward in the radial direction so that the plurality of planetary rollers face the sun roller.

According to another aspect of the present disclosure, a compressor system is provided including: a compressor; a driving machine which drives the compressor; and the transmission which is provided between the compressor and the driving machine.

According to the transmission and compressor system of the present disclosure, it is possible to suppress use of lubricating oil, facilitate maintenance, and increase a rotation speed.

DETAILED DESCRIPTION OF THE INVENTION

Hereinafter, embodiments of a transmission and a compressor system according to the present disclosure will be described with reference to the accompanying drawings. However, the present disclosure is not limited to the embodiments only.

(Configuration of Compressor System)

Figure 1:
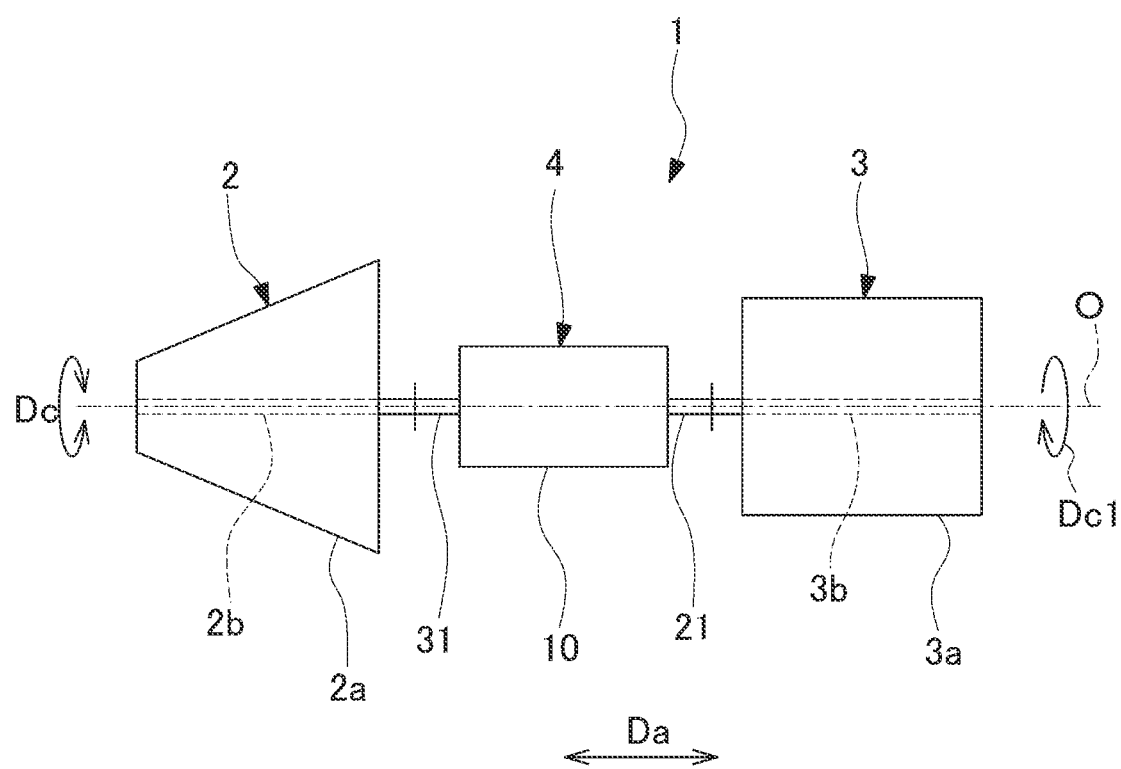
FIG. 1 is a schematic diagram illustrating a schematic configuration of a compressor system according to an embodiment of the present disclosure.

Hereinafter, a transmission and a compressor system according to an embodiment of the present disclosure will be described with reference to FIGS. 1 to 4. As illustrated in FIG. 1, a compressor system 1 includes a compressor 2, a driving machine 3, and a transmission 4.

(Configuration of Compressor)

The compressor 2 includes a compressor housing 2a and a rotor 2b. The compressor housing 2a accommodates the rotor 2b extending about an axis O. The rotor 2b extends in an axial direction Da in which the axis O extends. The rotor 2b is rotatably supported by the compressor housing 2a in a circumferential direction Dc around the axis O. A rotation of a motor rotor 3b of the driving machine 3 is transmitted to the rotor 2b, and thus, the rotor 2b is rotationally driven in the circumferential direction Dc. The compressor 2 compresses a fluid taken into the compressor housing 2a from an outside by the rotation of the rotor 2b. The compressor 2 feeds the compressed fluid to the outside.

(Configuration of Driving Machine)

The driving machine 3 drives the compressor 2. The driving machine 3 of the present embodiment is a motor. The driving machine 3 includes a motor housing 3a and the motor rotor 3b. A portion of the motor rotor 3b and a stator (not illustrated) are accommodated inside the motor housing 3a. The motor rotor 3b extends about the axis O so as to be disposed coaxially with the rotor 2b. The motor rotor 3b extends in the axial direction Da so as to protrude from the motor housing 3a. The motor rotor 3b is rotationally driven in a rotational direction Dc1 facing a first direction of the circumferential direction Dc.

(Configuration of Transmission)

Figure 2:
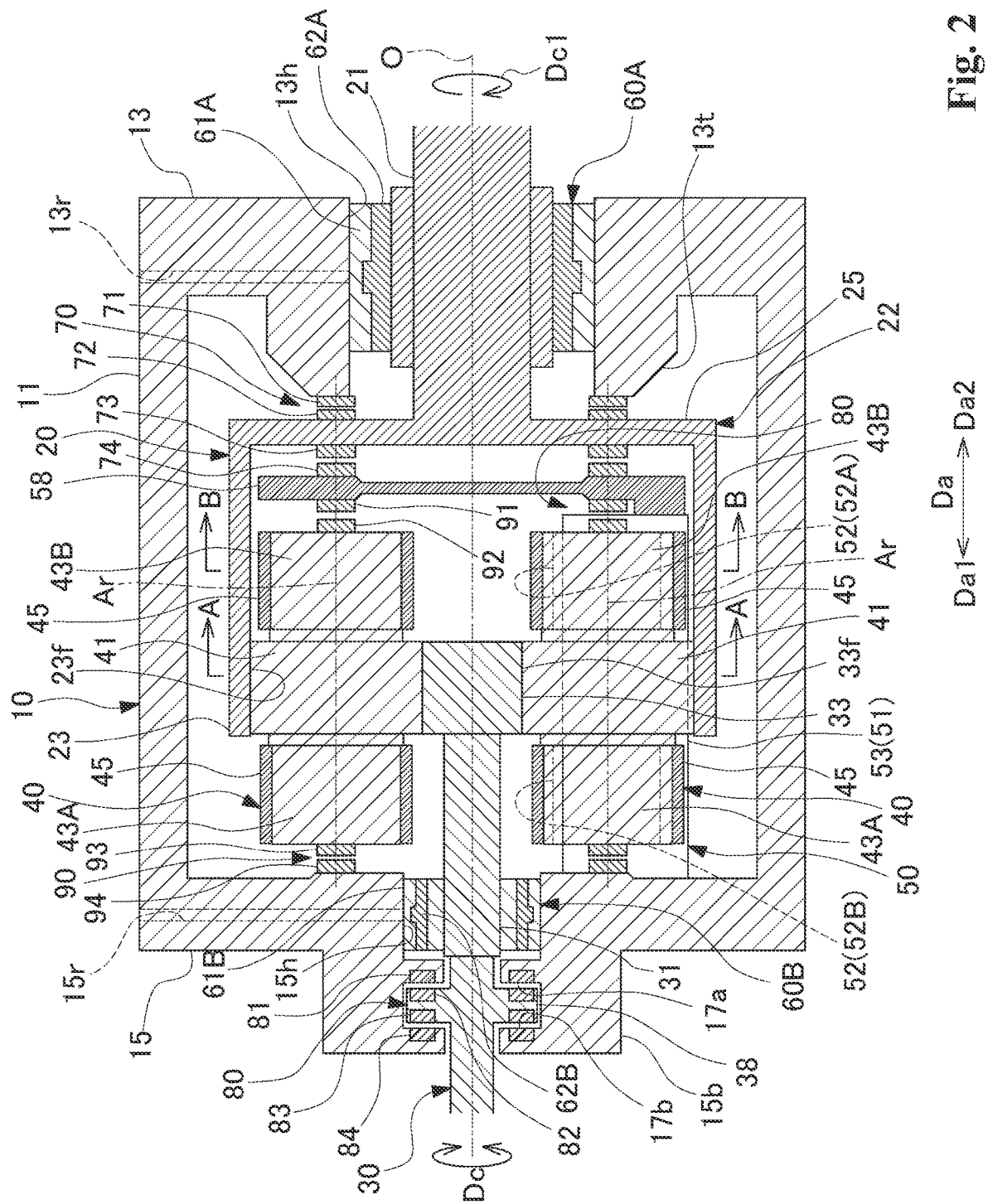
FIG. 2 is a cross-sectional view illustrating a configuration of a transmission provided in the compressor system.

The transmission 4 is disposed between the compressor 2 and the driving machine 3. The transmission 4 transmits the rotation of the motor rotor 3b of the driving machine 3 to the rotor 2b of the compressor 2 by accelerating or decelerating a speed. In the embodiment of the present disclosure, the transmission 4 is a speed increaser which accelerates the rotation of the motor rotor 3b and transmits the accelerated rotation to the rotor 2b. As illustrated in FIG. 2, the transmission 4 mainly includes a housing 10, a first radial bearing 60A, a first shaft member 20, a second radial bearing 60B, a second shaft member 30, a planetary roller 40, and a planetary roller holding portion 50.

(Configuration of Housing)

The housing 10 accommodates a portion of the first shaft member 20, the first radial bearing 60A, a portion of the second shaft member 30, the second radial bearing 60B, the planetary roller 40, and the planetary roller holding portion 50 inside the housing 10. The housing 10 is formed in a bottomed tubular shape about the axis O. The housing 10 includes a tubular portion 11, a first wall 13, and a second wall 15.

The tubular portion 11 is formed in a cylindrical shape extending in the axial direction Da to have a constant diameter dimension about the axis O from a first side Da1 in the axial direction Da which is a side close to the compressor 2 with respect to the transmission 4 toward a second side Da2 in the axial direction Da which is a side close to the driving machine 3 with respect to the transmission 4.

The first wall 13 is connected to an end portion of the tubular portion 11 on the second side Da2 in the axial direction Da. That is, the first wall 13 closes the end portion of the tubular portion 11 on the second side Da2 in the axial direction Da. The first wall 13 is formed in a disk shape extending in a direction (radial direction Dr) orthogonal to the axial direction Da about the axis O. A first shaft insertion hole 13h which penetrates the first wall 13 in the axial direction Da is formed in a central portion of the first wall 13. The first shaft insertion hole 13h is a through hole about the axis O.

The second wall 15 is connected to an end portion of the tubular 11 on the first side Da1 in the axial direction Da. That is, the second wall 15 closes the end portion of the tubular portion 11 on the first side Da1 in the axial direction Da. The second wall 15 is formed in a disk shape extending parallel to the first wall 13 about the formed in a central portion of the second wall 15. A second shaft insertion hole 15h which penetrates the second wall 15 in the axial direction Da is formed in the central portion of the second wall 15. The second shaft insertion hole 15h is a through hole about the axis O. The second shaft insertion hole 15h also penetrates the boss portion 15b.

(Structure of First Radial Bearing)

The first radial bearing 60A rotatably supports the first shaft member 20 with respect to the housing 10 about the axis O. The first radial bearing 60A is fixed to the first wall 13. The first radial bearing 60A is disposed inside in the radial direction Dr with respect to the first shaft insertion hole 13h formed in the first wall 13. The first radial bearing 60A is a dry-type bearing. For example, as the first radial bearing 60A, a gas bearing, a magnetic bearing, or a permanent magnet is used. In the embodiment of the present disclosure, as the first radial bearing 60A, a gas bearing is used, in which gas is supplied through a gas flow path 13r formed in the first wall 13 of the housing 10. For example, bleed air from a working fluid boosted by a compression unit (not illustrated) of the compressor 2 or gas from the outside is supplied to the first radial bearing 60A. The first radial bearing 60A includes a plurality of strip-shaped pads 62A and a bearing housing 61A which holds the plurality of pads 62A. The pad 62A is curved along an outer peripheral surface of a first shaft 21 described later. The bearing housing 61A is fixed to an inner peripheral surface of the first wall 13 forming the first shaft insertion hole 13h. The pad 62A floats with respect to the first shaft 21 against the weight of the pad 62A due to a static pressure generated by a gas supplied from the outside and a dynamic pressure generated in the gas entrained between the rotating first shaft 21 and the pad 62A, and thus, the first radial bearing 60A supports the first shaft 21 in a non-contact state.

(Structure of First Shaft Member)

The first shaft member 20 includes the first shaft 21 and a ring member 22.

The first shaft 21 extends in the axial direction Da about the axis O. The first shaft 21 is disposed in a state of being inserted into the first shaft insertion hole 13h. The first shaft 21 protrudes from the first wall 13 toward the second side Da2 in the axial direction Da. The first shaft 21 is coupled to the motor rotor 3b of the driving machine 3 outside the housing 10. That is, the first shaft 21 is an input shaft of the transmission 4 in the embodiment of the present disclosure. The first shaft 21 is rotatably supported around the axis O by the first radial bearing 60A.

The ring member 22 is accommodated inside the housing 10 on the first side Da1 in the axial direction Da with respect to the first shaft 21. The ring member 22 has a bottomed cylindrical shape extending in the axial direction Da. The ring member 22 is connected to an end portion of the first shaft 21 so as to rotate around the axis O together with the first shaft 21. Specifically, the ring member 22 is connected to the end portion of the first shaft 21 on the first side Da1 in the axial direction Da in the housing 10. That is, the ring member 22 is integrally formed with the first shaft 21. The ring member 22 includes a ring member body 23 and a ring member connection portion 25.

The ring member body 23 has a hollow cylindrical shape about the axis O. The ring member body 23 has a diameter dimension which is larger than an outer diameter of the first shaft 21 and smaller than an inner diameter of the tubular portion 11. An inner peripheral surface 23f having a circular shape when viewed from the axial direction Da is formed inside the radial direction Dr of the ring member body 23. The ring member body 23 has a constant inner diameter (position of the inner peripheral surface 23f) when viewed from the axial direction Da.

The ring member connection portion 25 is disposed on the second side Da2 in the axial direction Da with respect to the ring member body 23. The ring member connection portion 25 extends from the end portion of the first shaft 21 on the first side Da1 in the axial direction Da to the outside in the radial direction Dr. The ring member connection portion 25 is formed in a disk shape extending in the direction orthogonal to the axial direction Da about the axis O. The ring member connection portion 25 is disposed away from the first wall 13 on the first side Da1 in the axial direction Da. An outer peripheral edge portion of the ring member connection portion 25 is connected to the end portion of the ring member body 23 on the second side Da2 in the axial direction Da. In this way, the first shaft 21, the ring member connection portion 25, and the ring member body 23 are integrally formed with each other. That is, the ring member connection portion 25 and the ring member body 23 are rotatable around the axis O integrally with the first shaft 21.

(Structure of Second Radial Bearing)

The second radial bearing 60B rotatably supports the second shaft member 30 with respect to the housing 10 about the axis O. The second radial bearing 60B is fixed to the housing 10 on a side opposite to the first radial bearing 60A in the axial direction Da in a state where the ring member 22 is interposed therebetween. Specifically, the second radial bearing 60B is fixed to the second wall 15. The second radial bearing 60B is disposed inside in the radial direction Dr with respect to the second shaft insertion hole 15h formed in the second wall 15. The second radial bearing 60B is a dry-type bearing. For example, as the second radial bearing 60B, a gas bearing, a magnetic bearing, or a permanent magnet is used. In the embodiment of the present disclosure, similar to the first radial bearing 60A, as the second radial bearing 60B, a gas bearing is use in which gas is supplied through a gas flown path 15r formed in the second wall 15 of the housing 10. The gas is supplied to the second radial bearing 60B from the same source as that of the first radial bearing 60A. The second radial bearing 60B includes a plurality of strip-shaped pads 62B and a bearing housing 61B which holds the plurality of pads 62B. The pad 62B is curved along the outer peripheral surface of the second shaft 31 described later. The bearing housing 61B is fixed to the inner peripheral surface of the second wall 15 forming the second shaft insertion hole 15h. The pad 62B floats with respect to the second shaft 31 against the weight of the pad 62B due to a static pressure generated by a gas supplied from the outside and a dynamic pressure generated in the gas entrained between the rotating second shaft 31 and the pad 62B, and thus, the second radial bearing 60B supports the second shaft 31 in a non-contact state.

(Structure of Second Shaft Member)

The second shaft member 30 includes the second shaft 31 and a sun roller 33.

The second shaft 31 extends from the sun roller 33 to the first side Da1 in the axial direction Da about the axis O. The second shaft 31 extends toward a side opposite to the first shaft 21 in the axial direction Da. The second shaft 31 is disposed in a state of being inserted into the second shaft insertion hole 15h. The second shaft 31 protrudes from the second wall 15 toward the first side Da1 in the axial direction Da. The second shaft 31 is coupled to the rotor 2b of the compressor 2 outside the housing 10. That is, the second shaft 31 is an output shaft of the transmission 4 according to the embodiment of the present disclosure. The second shaft 31 is rotatably supported around the axis O by the second radial bearing 60B.

Moreover, a thrust disk 38 is formed on the second shaft 31. The thrust disk 38 is disposed on the first side Da1 in the axial direction Da with respect to the second radial bearing 60B. The thrust disk 38 extends from the second shaft 31 to the outside in the radial direction Dr. The thrust disk 38 is formed in a disk shape extending in the direction orthogonal to the axial direction Da about the axis O.

The sun roller 33 is connected to an end portion of the second shaft 31 on the second side Da2 in the axial direction Da. The sun roller 33 is disposed inside the radial direction Dr with respect to the ring member 22. The sun roller 33 is formed in a columnar shape about the axis O. That is, the sun roller 33 is disposed coaxially with the second shaft 31. The sun roller 33 is disposed so that a position in the axial direction Da overlaps the ring member body 23. The sun roller 33 is disposed inside the ring member body 23 in the radial direction Dr. The sun roller 33 is a parallel roller having a constant outer diameter (position of an outer peripheral surface 33f) when viewed from the axial direction Da. The outer peripheral surface 33f of the sun roller 33 is a curved surface having no unevenness in the circumferential direction Dc around the axis O.

(Configuration of Planetary Roller)

Figure 3:
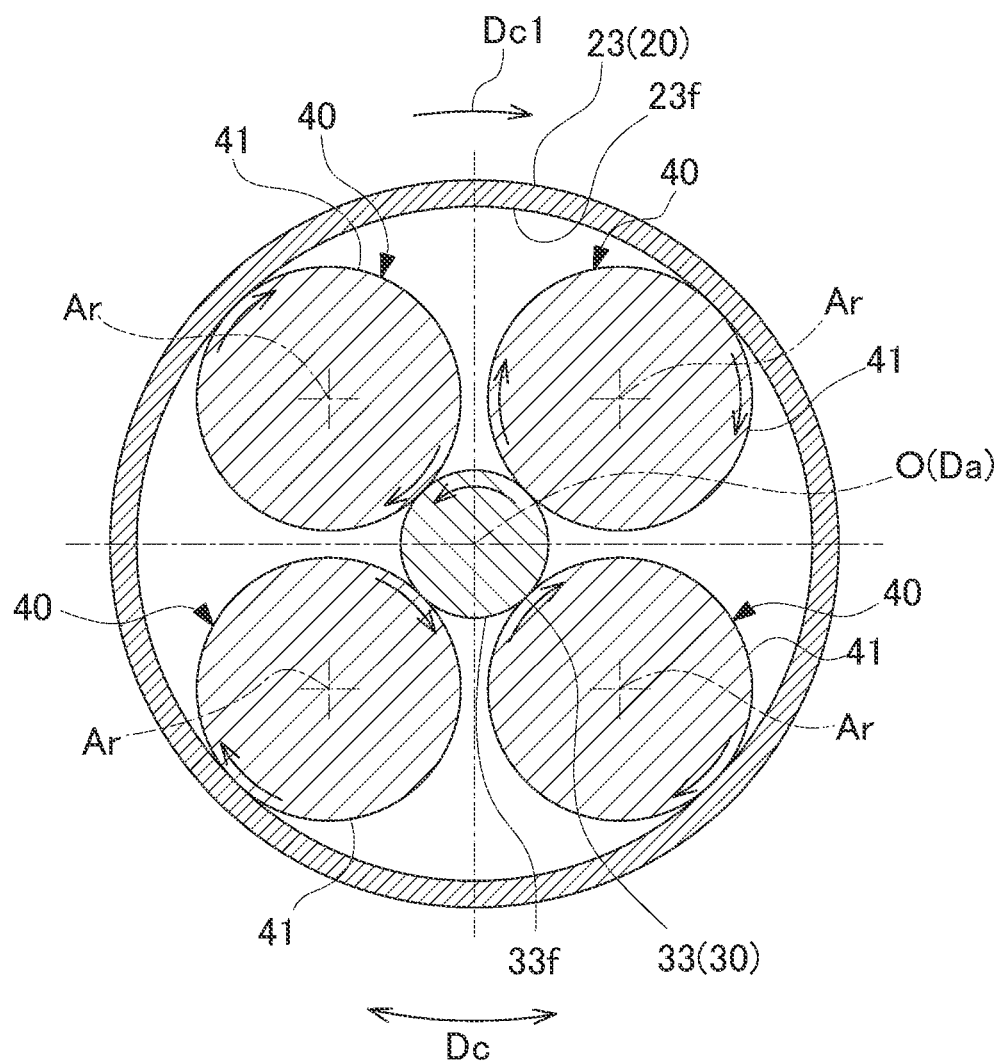
FIG. 3 is a cross-sectional view taken along line A-A of FIG. 2.

As illustrated in FIGS. 2 and 3, the planetary roller 40 is disposed between the inner peripheral surface 23f of the ring member body 23 and the sun roller 33 in the radial direction Dr about the axis O. The planetary roller 40 is disposed in a state of being in contact with the inner peripheral surface 23f of the ring member body 23 and the outer peripheral surface 33f of the sun roller 33. A plurality of planetary rollers 40 are disposed at intervals in the circumferential direction Dc. In the embodiment of the present disclosure, four sets of planetary rollers 40 are disposed at equal intervals in the circumferential direction Dc. Each planetary roller 40 includes a roller main body 41, supported rollers 43A and 43B, and a roller sleeve 45.

The roller main body 41 is in sliding contact with the inner peripheral surface 23f of the ring member body 23 and the outer peripheral surface 33f of the sun roller 33. The roller main body 41 has a columnar shape extending along a roller axis Ar located outside of the axis O in the radial direction Dr. Here, the roller axis Ar is parallel to the axis O (axial direction Da). The roller main body 41 is a parallel roller having a constant outer diameter along the roller axis Ar. A roller outer surface 41f of the roller main body 41 is a curved surface having no unevenness in the circumferential direction Dc around the axis O. The roller main body 41 is rotationally driven to rotate about the roller axis Ar located outside the axis O in the radial direction Dr between the inner peripheral surface 23f of the ring member body 23 and the outer peripheral surface 33f of the sun roller 33.

As illustrated in FIG. 2, the supported rollers 43A and 43B extend from the roller main body 41 in the axial direction Da. The supported rollers 43A and 43B extend to both sides in the axial direction Da with respect to the roller main body 41. The supported roller (first supported roller) 43A extends from the roller main body 41 on the first side Da1 in the axial direction Da. The supported roller (second supported roller) 43B extends from the roller main body 41 to the second side Da2 in the axial direction Da. Each of the supported rollers 43A and 43B is formed to have an outer diameter smaller than that of the roller main body 41. Each of the supported rollers 43A and 43B is supported by the planetary roller holding portion 50.

The roller sleeve 45 has a cylindrical shape extending along the roller axis Ar. The roller sleeve 45 is provided on each of the supported rollers 43A and 43B. Each of the supported rollers 43A and 43B is fixed to the roller sleeve 45 in a state of being inserted into the roller sleeve 45. The roller sleeve 45 rotates together with the supported rollers 43A and 43B.

The roller main bodies 41 of the plurality of planetary rollers 40 are pressed against each other in the radial direction by interference fit between the inner peripheral surface 23f of the ring member body 23 of the first shaft member 20 and the outer peripheral surface 33f of the sun roller 33. In other words, the ring member body 23 is in contact with the plurality of roller main bodies 41 in a state of pressing the plurality of roller main bodies 41 to the inside in the radial direction Dr toward the sun roller 33. Here, it is preferable to set a diameter of the ring member body 23 so that a tightening ratio is 2.6/1000 or less. For example, more preferably, tightening ratios of the plurality of planetary rollers 40 and the sun rollers 33 by the ring member body 23 is 2.0/1000.

As illustrated in FIG. 3, when the ring member body 23 rotates around the axis O together with the first shaft 21, each roller main body 41 rotates around the roller axis Ar due to sliding contact between the inner peripheral surface 23f of the ring member body 23 and the roller outer surface 41f of the roller main body 41. When the plurality of roller main bodies 41 rotate, the sun roller 33 rotates around the axis O due to sliding contact between the roller outer surfaces 41f of the roller main bodies 41 and the outer peripheral surface 33f of the sun roller 33. The rotation of the sun roller 33 causes the second shaft 31 to rotate.

Here, for example, preferably, a roller peripheral speed of each planetary roller 40 around the axis O during a rated operation is in a range of 100 m/s to 200 m/s. More preferably, the roller peripheral speed of each planetary roller 40 is in the range of 160 m/s to 190 m/s. Even more preferably, the roller peripheral speed of each planetary roller 40 is in the range of 170 m/s to 180 m/s.

(Configuration of Planetary Roller Holding Portion)

Figure 4:
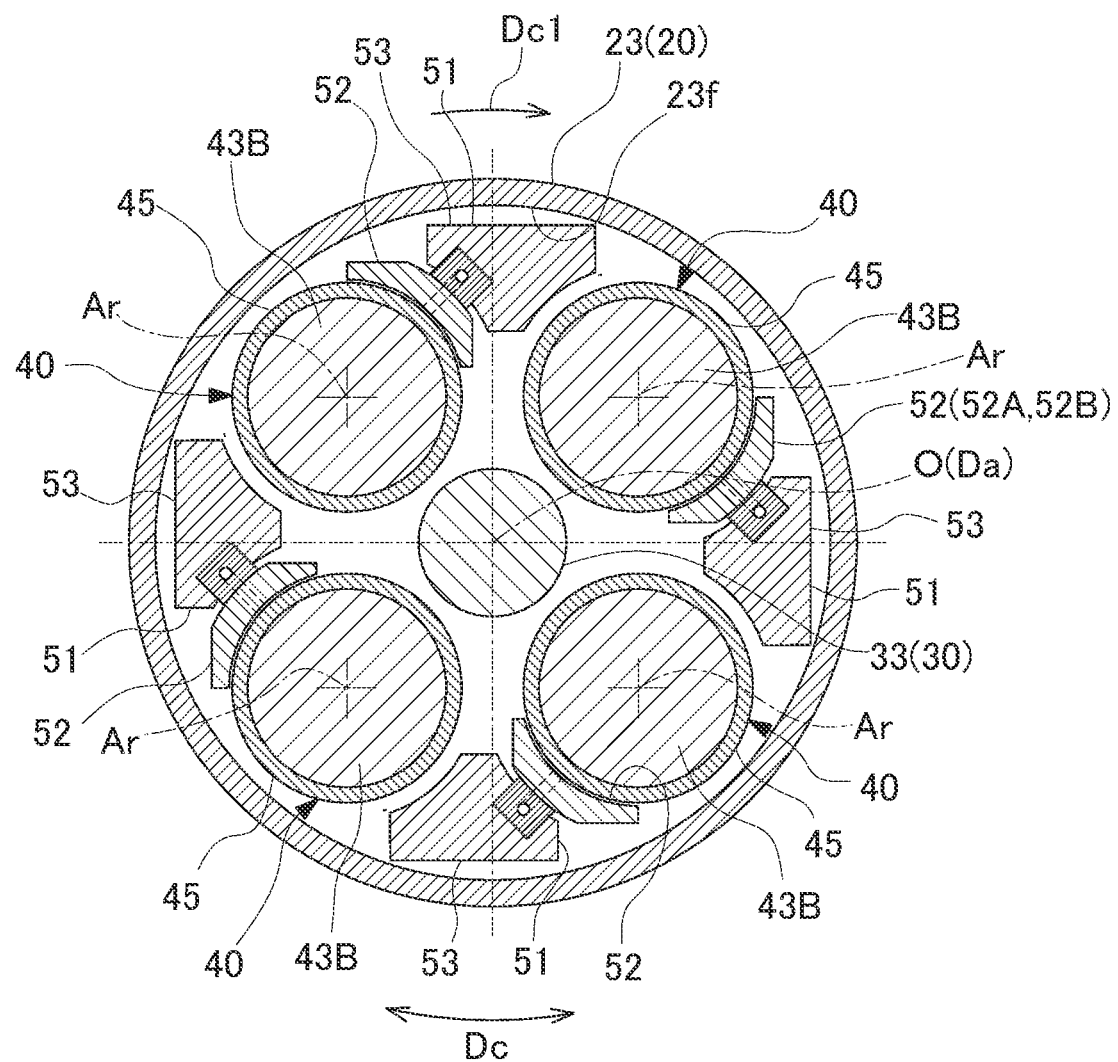
FIG. 4 is a cross-sectional view taken along line B-B of FIG. 2.

As illustrated in FIGS. 2 and 4, the planetary roller holding portion 50 includes a plurality of planetary roller supporting members 51 and facing members 58. The plurality of planetary roller supporting members 51 are disposed between the inner peripheral surface 23f of the ring member body 23 and the sun roller 33 in the radial direction Dr about the axis O. The plurality of planetary roller supporting members 51 are disposed at intervals in the circumferential direction Dc so as to correspond to the plurality of planetary rollers 40, respectively. Each planetary roller supporting member 51 rotatably supports the planetary roller 40 around the roller axis Ar and restrains the movement of the planetary roller 40 in the circumferential direction Dc. Each planetary roller supporting member 51 is disposed on only one side in the circumferential direction Dc with respect to each planetary roller 40 when viewed from the axial direction Da. The planetary roller supporting member 51 includes a support pad 52 and a pad support member 53.

The pad support member 53 extends parallel to the axial direction Da. An end portion of the pad support member 53 on the first side Da1 in the axial direction Da is fixed to the second wall 15 of the housing 10. An end portion of the pad support member 53 on the second side Da2 in the axial direction Da protrudes slightly from the supported roller 43B to the second side Da2 (to a position close to the first wall 13) in the axial direction Da. The pad support member 53 fixes a position of the support pad 52 and restrains a movement of the support pad 52 in the circumferential direction Dc.

The support pad 52 is accommodated inside the ring member body 23. The support pad 52 rotatably supports the planetary roller 40 around the roller axis Ar. The movement of the support pad 52 in the circumferential direction Dc around the axis O is restrained by the pad support member 53, and thus the support pad 52 is held. The support pad 52 is disposed so as to face each of the supported rollers 43A and 43B of the planetary roller 40 in the circumferential direction Dc. That is, the support pad 52 includes a first support pad 52A and a second support pad 52B disposed at different positions in the axial direction Da.

The first support pad 52A is disposed at the same position as that of the supported roller 43A in the axial direction Da. The second support pad 52B is disposed at the same position as that of the supported roller 43A in the axial direction Da.

Each of the first support pad 52A and the second support pad 52B is swingably supported by the pad support member 53. In the embodiment of the present disclosure, the support pad 52 is disposed on only one side of the circumferential direction Dc with respect to the planetary roller 40. The support pad 52 is disposed only in front of the planetary roller 40 in the rotational direction Dc1 of the shaft serving as the input shaft out of the first shaft 21 and the second shaft 31. That is, the first support pad 52A and the second support, pad 52B are disposed only in front of the supported rollers 43A sand 43B in the rotational direction Dc1 of the first shaft 21 which is the input shaft.

The support pad 52 of the present embodiment is a gas bearing. Gas is supplied to the support pad 52 through a gas flow path (not illustrated) formed in the pad support member 53. The support pad 52 is curved along an outer peripheral surface of the roller sleeve 45. The support pad 52 floats against its own weight due to a static pressure caused by gas supplied from the outside between the support pad 52 and the roller sleeve 45 and a dynamic pressure generated by entrained therebetween, and thus, the support pad 52 supports the roller sleeve 45 in a non-contact state. In this way, the planetary roller 40 is rotatably supported around the roller axis Ar by the support pad 52 via the roller sleeve 45.

As illustrated in FIG. 2, the facing member 58 are disposed at intervals from the ring member connection portion 25 on the first side Da1 in the axial direction Da. The facing member 58 is disposed at a position away from the planetary roller 40 on the second side Da2 in the axial direction Da. That is, the facing member 58 is disposed between the ring member connection portion 25 and the plurality of planetary rollers 40 in the axial direction Da. The facing member 58 has a disk shape extending in the radial direction Dr so as to be orthogonal to the axis O. The facing member 58 is connected to an end portion of the pad support member 53 on the second side Da2 in the axial direction Da. Accordingly, the facing member 58 is fixed to the housing 10 via the pad support member 53. Further, the facing member 58 couples the pad support members 53 of the plurality of planetary roller supporting members 51 to each other at the end portion on the second side Da2 side in the axial direction Da.

(Configuration of Thrust Bearing)

The transmission 4 further includes a first thrust bearing 70, a second thrust bearing 80, and a roller thrust bearing 90.

(Configuration of First Thrust Bearing)

The first thrust bearing 70 restrains a movement of the first shaft member 20 in the axial direction Da (thrust direction). The first thrust bearing 70 restrains the movement of the ring member connection portion 25 in the axial direction Da between the first wall 13 and the ring member connection portion 25, and between the facing member 58 and the ring member connection portion 25. In the embodiment of the present disclosure, for example, the first thrust bearing 70 is a magnetic bearing. The first thrust bearing 70 has permanent magnets 71 to 74.

The permanent magnet 71 is disposed on a surface of the first wall 13 facing the first side Da1 in the axial direction Da on a distal end of a protruding portion 13t protruding from the first side Da1 in the axial direction Da. A plurality of permanent magnets 71 are disposed at equal intervals in the circumferential direction Dc. The permanent magnet 72 is disposed on a surface of the ring member connection portion 25 facing the second side Da2 in the axial direction Da. A plurality of permanent magnets 72 are disposed at equal intervals in the circumferential direction Dc. Each permanent magnet 72 is disposed at a position overlapping the permanent magnet 71 when viewed from the axial direction Da so as to face the permanent magnet 71 in the axial direction Da. That is, the permanent magnet 71 and the permanent magnet 72 are disposed at the same position in the circumferential direction Dc. Directions of magnetic poles of the permanent magnet 71 and the permanent magnet 72 are set so that the magnets 71 and 72 repel each other.

The permanent magnet 73 is disposed on a surface of the ring member connection portion 25 facing the first side Da1 in the axial direction Da. A plurality of permanent magnets 73 are disposed at equal intervals in the circumferential direction Dc. The permanent magnet 74 is disposed on a surface of the facing member 58 facing the second side Da2 in the axial direction Da. A plurality of permanent magnets 74 are disposed at equal intervals in the circumferential direction Dc. Each permanent magnet 74 is disposed at a position overlapping the permanent magnet 73 when viewed from the axial direction Da so as to face the permanent magnet 73 in the axial direction Da. That is, the permanent magnet 73 and the permanent magnet 74 are disposed at the same position in the circumferential direction Dc. Directions of magnetic poles of the permanent magnet 73 and the permanent magnet 74 are set so that the magnets 73 and 74 repel each other.

(Configuration of Second Thrust Bearing)

The second thrust bearing 80 restrains a movement of the second shaft member 30 in the axial direction Da. The second thrust bearing 80 restrains a movement of the thrust disk 38 in the axial direction Da in a recess 17 formed in the housing 10.

Here, case facing surfaces 17a and 17b are formed in the boss portion 15b of the second wall 15. The recess 17 is recessed from an inner peripheral surface of the boss portion 15b forming the second shaft insertion hole 15h to the outside in the radial direction Dr. The recess 17 is formed in a size capable of accommodating the thrust disk 38. The case facing surfaces 17a and 17b are formed both sides of the recess 17 in the axial direction Da. The thrust disk 38 is disposed at intervals in the axial direction Da with respect to the case facing surfaces 17a and 17b. The case facing surface 17a is a plane facing the first side Da1 in the axial direction Da. The case facing surface 17b is a plane facing the second side Da2 in the axial direction Da.

In the embodiment of the present disclosure, example, the second thrust bearing 80 is a magnetic bearing. The second thrust bearing 80 has permanent magnets 81 to 84.

The permanent magnet 81 is disposed on the case facing surface 17a facing the first side Da1 in the axial direction Da. A plurality of permanent magnets 81 are disposed at equal intervals in the circumferential direction Dc. The permanent magnet 82 is disposed on a surface of the thrust disk 38 facing the second side Da2 in the axial direction Da. A plurality of permanent magnets 82 are disposed at equal intervals in the circumferential direction Dc. Each permanent magnet 82 is disposed at a position overlapping the permanent magnet 81 when viewed from the axial direction Da so as to face the permanent magnet 81 in the axial direction Da. That is, the permanent magnet 81 and the permanent magnet 82 are disposed at the same position in the circumferential 312 direction Dc. Directions of magnetic poles of the permanent magnet 81 and the permanent magnet 82 are set so that the magnets 81 and 82 repel each other.

The permanent magnet 83 is disposed on a surface of the thrust disk 38 facing the first side Da1 in the axial direction Da. A plurality of permanent magnets 83 are provided at equal intervals in the circumferential direction Dc. The permanent magnet 84 is disposed on the case facing surface 17b facing the second side Da2 in the axial direction Da. A plurality of permanent magnets 84 are disposed at equal intervals in the circumferential direction Dc. Each permanent magnet 84 is disposed at a position overlapping the permanent magnet 83 when viewed from the axial direction Da so as to face the permanent magnet 83 in the axial direction Da. That is, the permanent magnet 83 and the permanent magnet 84 are disposed at the same position in the circumferential direction Dc. Directions of magnetic poles of the permanent magnet 83 and the permanent magnet 84 are set so that the magnets 83 and 84 repel each other.

(Configuration of Roller Thrust Bearing)

The roller thrust bearing 90 restrains a movement of the planetary roller 40 in the axial direction Da (thrust direction). The roller thrust bearing 90 restrains the movement of the planetary roller 40 in the axial direction Da between the facing member 58 and the second all 15. In the embodiment of the present disclosure, for example, the roller thrust bearing 90 is magnetic bearing. The roller thrust bearing 90 has permanent magnets 91 to 94.

The permanent magnet 91 is disposed on a surface of the facing member 58 facing the first side Da1 in the axial direction Da. A plurality of permanent magnets 91 are disposed at equal intervals in the circumferential direction Dc. The permanent magnet 92 is disposed on a surface of the planetary roller 40 facing the second side Da2 in the axial direction Da. Specifically, the permanent magnet 92 is disposed on an end face of the supported roller 43B facing the second side Da2 in the axial direction Da. A plurality of permanent magnets 92 are disposed at equal intervals in the circumferential direction Dc. Each permanent magnet 92 is disposed at a position overlapping the permanent magnet 91 when viewed from the axial direction Da so as to face the permanent magnet 91 in the axial direction Da. That is, the permanent magnet 91 and the permanent magnet 92 are disposed at the same position in the circumferential direction Dc. Directions of magnetic poles of the permanent magnet 91 and permanent magnet 92 are set so that the magnets 91 and 92 repel each other.

The permanent magnet 93 is disposed on a surface of the planetary roller 40 facing the first side Da1 in the axial direction Da. Specifically, the permanent magnet 93 is disposed on an end face of the supported roller 43A facing the first side Da1 in the axial direction Da. A plurality of permanent magnets 93 are disposed at equal intervals in the circumferential direction Dc. The permanent magnet 94 is disposed on a surface of the second wall 15 facing the second side Da2 in the axial direction Da. A plurality of permanent magnets 94 are disposed at equal intervals in the circumferential direction Dc. Each permanent magnet 94 is disposed at a position overlapping the permanent magnet 93 when viewed from the axial direction Da so as to face the permanent magnet 93 in the axial direction Da. That is, the permanent magnet 93 and the permanent magnet 94 are disposed at the same position in the circumferential direction Dc. Directions of magnetic poles of the permanent magnet 93 and the permanent magnet 94 are set so that the magnets 93 and 94 repel each other. The permanent magnets 71 to 74, the permanent magnets 81 to 84, and the permanent magnets 91 to 94 are formed in the same shape except that magnetism thereof is different.

(Supply of Gas into Housing)

In the transmission 4, the gas supplied to the first radial bearing 60A, the second radial bearing 60B, and the support pad 52 is discharged from the first radial bearing 60A and the second radial bearing 60B into the housing 10.

(Effect)

In the transmission 4 having the above configuration, the first shaft 21 and the second shaft 31 are rotatably supported by the dry-type first radial bearing 60A and second radial bearing 60B, respectively. Further, the ring member body 23 presses a plurality of roller main bodies 41 which are in sliding contact with each other toward the sun roller 33. Moreover, the roller main body 41 is supported by the planetary roller supporting member 51 in a state of being restrained from moving in the circumferential direction Dc via the supported rollers 43A and 43B. According to the structure, the rotation of the ring member body 23 integrally rotated with the first shaft 21 is transmitted to the roller main body 41 which is in sliding contact with the inner peripheral surface 23f of the ring member body 23. The roller main body 41 is supported by the planetary roller supporting member 51 so as to be rotatable and unable to move in the circumferential direction Dc. Therefore, the roller main body 41 continues to rotate on the spot, and the rotation of the roller main body 41 is transmitted to the sun roller 33 with which the roller main body 41 is in sliding contact. Accordingly, the second shaft 31 integrally formed with the sun roller 33 rotates. In this way, the rotation is transmitted between the first shaft 21 and the second shaft 31. Further, when the rotation is transmitted from the first shaft 21 to the second shaft 31, the rotation of the first shaft 21 is accelerated and transmitted to the second shaft 31.

Further, since the ring member body 23, the plurality of planetary rollers 40, and the sun rollers 33 are pressed against each other in the radial direction Dr by the interference fit, slippage between the first shaft 21 and the second shaft 31 is suppressed. Therefore, the rotation can be efficiently transmitted from the first shaft 21 to the second shaft 31.

In addition, since the dry-type first radial bearing 60A and second radial bearing 60B are used, the first shaft 21 and the second shaft 31 can be supported without using lubricating oil. Since no lubricating oil is used not only between the bearings but also between the ring member body 23, the plurality of planetary rollers 40, and the sun rollers 33, the transmission 4 can be configured so that the use of the lubricating oil is suppressed. Therefore, an amount of lubricating oil used can be suppressed, maintenance can be facilitated, and a rotation speed can increase.

Further, since the roller main body 41 and the sun roller 33 are constituted by parallel rollers, the slippage between the roller main body 41 and the sun roller 33 can be further suppressed as compared with a case where the roller main body 41 and the sun roller 33 are constituted by tapered rollers. Therefore, wear of the roller main body 41 and the sun roller 33 can be suppressed.

Moreover, the planetary roller 40 includes the roller main body 41 which is in contact with the ring member body 23 and the sun roller 33, and supported rollers 43A and 43B which extend from the roller main body 41 so as to protrude in the axial direction Da and are supported by the planetary roller supporting member 51. Since the supported rollers 43A and 43B are supported by the planetary roller supporting member 51, the planetary roller 40 can be supported so that a space in the radial direction Dr is suppressed. Therefore, a structure for transmitting rotation between the ring member 22 and the sun roller 33 via the planetary roller 40 can be formed small in the radial direction Dr. As a result, it is possible to reduce a size of the transmission 4.

Further, since the supported rollers 43A and 43B are disposed on both sides in the axial direction Da with respect to the roller main body 41, the roller main body 41 can be supported in a stable state. Therefore, the planetary roller 40 can be rotated stably.

Further, the support pad 52 can rotatably support the roller main body 41 around the roller axis Ar. The support pad 52 is restrained from moving in the circumferential direction Dc by the pad support member 53. Therefore, a space inside the ring member body 23 in the radial direction Dr can be effectively used to rotatably support the planetary roller 40 around the roller axis Ar, and it is possible to restrain the movement of the planetary roller 40 in the circumferential direction Dc.

Further, the support pad 52 is disposed only in front of the roller main body 41 in the rotational direction Dc1 of the first shaft 21 which is the input shaft. Therefore, the planetary roller 40 can be rotatably and immovably supported with the minimum number of members.

Further, the first thrust bearing 70 which restrains the movement of the ring member connection portion 25 in the axial direction Da is constituted by a magnetic bearing. Further, the second thrust bearing 80 which restrains the movement of the thrust disk 38 in the axial direction Da is constituted by a magnetic bearing. Similarly, the roller thrust bearing 90 which restrains the movements of the plurality of planetary rollers 40 in the axial direction Da is constituted by a magnetic bearing. Therefore, the movements of the first shaft 21, the second shaft 31, and the planetary roller 40 in the axial direction Da can be suppressed without using lubricating oil. As a result, the transmission 4 which does not use lubricating oil can be configured. Accordingly, the amount of lubricating oil used is greatly suppressed, the maintenance can be facilitated, and the rotation speed can further increase.

Further, the gas supplied to the first radial bearing 60A and the second radial bearing 60B, which are gas bearings, is discharged into the housing 10. As a result, increases in temperatures of sliding contact surfaces of the ring member body 23, the planetary roller 40, and the sun roller 33 in the housing 10 can be suppressed by the discharged gas.

Other Embodiments

Hereinbefore, the embodiment of the present disclosure is described in detail with reference to the drawings, but the specific configuration is not limited to the embodiment, and includes design changes or the like within a scope which does not depart from a gist of the present disclosure.

In the above embodiment, the supported rollers 43A and 43B are provided on both sides of the roller main body 41 in the axial direction Da, but the present invention is not limited to this. For example, the supported rollers 43A and 43B may be provided only on either the first side Da1 or the second side Da2 in the axial direction Da.

Further, for example, a plurality of roller main bodies 41 may be provided at intervals in the axial direction Da, and the supported rollers may be provided between the plurality of roller main bodies 41.

Further, in the above embodiment, the first shaft 21 is the input shaft and the second shaft 31 is the output shaft, but the present invention is not limited to this. The second shaft 31 may be used as the input shaft, the first shaft 21 may be used as the output shaft, and the transmission 4 may be used as a speed reducer.

Further, in the above embodiment, the transmission 4 is applied to the compressor system 1, but the present invention is not limited to this. The transmission 4 may be provided between various rotating machines other than the compressor 2 and the driving machine 3 for driving the rotating machine. For example, the transmission 4 may be provided between a steam turbine (driving machine) and a generator (rotating machine).

<Appendix>

For example, the transmission 4 described in the embodiment is ascertained as follows.

(1) According to a first aspect, there is provided the transmission 4 including: the housing 10; the first radial bearing 60A which is dry-type and is fixed to the housing 10; the first shaft 21 which is supported by the first radial bearing 60A to be rotatable around the axis O with respect to the housing 10; the ring member 22 which is accommodated inside the housing 10, has a cylindrical shape extending in the axial direction Da in which the axis O extends, and is connected to the end portion of the first shaft 21 so as to rotate around the axis O together with the first shaft 21; the second radial bearing 60B which is dry-type and is fixed to the housing 10 on a side opposite to the first radial bearing 60A in the axial direction Da in a state where the ring member 22 is interposed therebetween; the sun roller 33 which is disposed inside the ring member 22 in a radial direction Dr about the axis O and has a columnar shape about the axis O; the second shaft 31 which extends from the sun roller 33 to the first side Da1 in the axial direction Da and is rotatably supported around the axis O by the second radial bearing 60B; the plurality of the planetary rollers 40 which formed in a columnar shape and are disposed at intervals in the circumferential direction Dc around the axis O in a state of being in contact with the inner peripheral surface of the ring member 22 and the outer peripheral surface 33f of the sun roller 33; and the planetary roller supporting member 51 which rotatably support each of the plurality of planetary rollers 40 around the roller axis Ar of each of the plurality of the planetary rollers 40 and restrains the movement of each of the plurality of the planetary rollers 40 in the circumferential direction Dc, in which the ring member 22 is in contact with the plurality of planetary rollers 40 in a state of pressing the plurality of planetary rollers 40 inward in the radial direction Dr so that the plurality of planetary rollers 40 face the sun roller 33. Examples of the dry-type first radial bearing 60A and second radial bearing 60B include a gas bearing, a magnetic bearing, and a permanent magnet.

The rotation of the ring member 22 integrally rotated with the first shaft 21 is transmitted to the planetary roller 40 which is in sliding contact with the inner peripheral surface of the ring member. The planetary roller 40 is supported by the planetary roller supporting member 51 so as to be rotatable and unable to move in the circumferential direction Dc. Therefore, the planetary roller 40 continues to rotate on the spot, and the rotation of the planetary roller 40 is transmitted to the sun roller 33. Accordingly, the second shaft 31 integrally formed with the sun roller 33 rotates. In this way, the rotation is transmitted between the first shaft 21 and the second shaft 31. Further, the ring member 22 is in contact with the plurality of planetary rollers 40 in a state of pressing the plurality of planetary rollers 40 inward in the radial direction Dr so that the plurality of planetary rollers face the sun roller 33. Therefore, it is possible to suppress slippage between the first shaft 21 and the second shaft 31. Therefore, the rotation can be efficiently transmitted from the first shaft 21 to the second shaft 31. In addition, since the dry-type first radial bearing 60A and second radial bearing 60B are used, the first shaft 21 and the second shaft 31 can be supported without using lubricating oil. Since no lubricating oil is used not only between the bearings but also between the ring member 22, the plurality of planetary rollers 40, and the sun rollers 33, the transmission 4 can be configured so that the use of the lubricating oil is suppressed. Therefore, an amount of lubricating oil used can be suppressed, maintenance can be facilitated, and a rotation speed can increase.

(2) According to the transmission 4 of a second aspect, in the transmission 4 of (1), each of the plurality of the planetary rollers 40 may include the roller main body 41 which is in sliding contact with the inner peripheral surface of the ring member 22 and the outer peripheral surface 33f of the sun roller 33, and the supported rollers 43A and 43B which extends from the roller main body 41 in the axial direction Da and is supported by the planetary roller supporting member 51.

Since the supported rollers 43A and 43B are supported by the planetary roller supporting member 51, the planetary roller 40 can be supported so that a space in the radial direction Dr is suppressed. Therefore, a structure for transmitting rotation between the ring member 22 and the sun roller 33 via the planetary roller 40 can be formed small in the radial direction Dr. As a result, it is possible to reduce a size of the transmission 4.

(3) According to the transmission 4 of a third aspect, in the transmission 4 of (2), the supported rollers 43A and 43B may extend to both sides in the axial direction Da with respect to the roller main body 41.

Therefore, the roller main body 41 can be supported in a stable state. Therefore, the planetary roller 40 can be rotated stably.

(4) According to the transmission 4 of a fourth aspect, in the transmission 4 of any one of (1) to (3), the planetary roller supporting member 51 may include the support pad 52 which is accommodated inside the ring member 22 and rotatably supports each of the plurality of the planetary rollers 40 around the roller axis Ar, and the pad support member 53 which is fixed to the housing 10 and restrains the movement of the support pad 52 in the circumferential direction Dc.

Accordingly, the support pad 52 can rotatably support the roller main body 41 around the roller axis Ar. The support pad 52 is restrained from moving in the circumferential direction Dc by the pad support member 53. Therefore, the space inside the ring member 22 in the radial direction Dr can be effectively used to rotatably support the planetary roller 40 around the roller axis Ar, and it is possible to restrain the movement of the planetary roller 40 in the circumferential direction Dc.

(5) According, to the transmission 4 of a fifth aspect, in the transmission 4 of (4), the support pad 52 may be disposed only in front of each of the plurality of the planetary rollers 40 in the rotational direction Dc1 of the shaft serving as the input shaft out of the first shaft 21 and the second shaft 31.

Therefore, the planetary roller 40 can be rotatably and immovably supported with the minimum number of members.

(6) According to the transmission 4 of a sixth aspect, the transmission 4 of any one of (1) to (5) may further include the roller thrust bearing 90 which restrains the movement of each of the plurality of the planetary rollers 40 in the axial direction Da, in which the roller thrust bearing 90 may be a magnetic bearing.

Accordingly, the movement of the planetary roller 40 in the axial direction Da can be suppressed without using the lubricating oil.

(7) According to a seventh aspect, there is provided the compressor system 1 including: the compressor 2; the driving machine 3 which drives the compressor 2; and the transmission 4 according to any one of (1) to (6) which is disposed between the compressor 2 and the driving machine 3.

Therefore, it is possible to constitute the compressor system 1 having the transmission 4 capable of suppressing the use of the lubricating oil, facilitating the maintenance, and increasing the rotation speed.

EXPLANATION OF REFERENCES

1: compressor system
2: compressor
2a: compressor housing
2b: rotor
3: driving machine
3a: motor housing
3b: motor rotor
4: transmission
10: housing
11: tubular portion
13: first wall
13h: first shaft insertion hole
13r: gas flow path
13t: protruding portion
15: second wall
15b: boss portion
15h: second shaft insertion hole
15r: gas flow path
17: recess
17a and 17b: case facing surface
20: first shaft member
21: first shaft
22: ring member
23: ring member body
23f: inner peripheral surface
25: ring member connection portion
30: second shaft member
31: second shaft
33: sun roller
33f: outer peripheral surface
38: thrust disk
40: planetary roller
41: roller main body
41f: roller outer surface
43A, 43B: supported roller
45: roller sleeve
50: planetary roller holding portion
51: planetary roller supporting member
52: support pad
52A: first support pad
52B: second support pad
53: pad support member
58: facing member
60A: first radial bearing
60B: second radial bearing
61A, 61B: bearing housing
62A, 62B: pad
70: first thrust bearing
71 to 74: permanent magnet
80: second thrust bearing
81 to 84: permanent magnet
90: roller thrust bearing
91 to 94: Permanent magnet Ar: roller axis
Da: axial direction
Da1: first side
Da2: second side
Dc: circumferential direction
Dc1: rotational direction
Dr: radial direction
O: axis

What is claimed is:

1. A transmission comprising:
a housing;
a first radial bearing which is dry-type and is fixed to the housing;
a first shaft which is supported by the first radial bearing to be rotatable around an axis with respect to the housing;
a ring member which is accommodated inside the housing, has a cylindrical shape extending in an axial direction in which the axis extends, and is connected to an end portion of the first shaft so as to rotate around the axis together with the first shaft;
a second radial bearing which is dry-type and is fixed to the housing on a side opposite to the first radial bearing in the axial direction in a state where the ring member is interposed therebetween;
a sun roller which is disposed inside the ring member in a radial direction about the axis and has a columnar shape about the axis;
a second shaft which extends from the sun roller to a first side in the axial direction and is rotatably supported around the axis by the second radial bearing;
a plurality of planetary rollers which formed in a columnar shape and are disposed at intervals in a circumferential direction around the axis in a state of being in contact with an inner peripheral surface of the ring member and an outer peripheral surface of the sun roller;
a planetary roller supporting member which rotatably supports each of the plurality of planetary rollers around a roller axis of each of the plurality of planetary rollers and restrains a movement of each of the plurality of planetary rollers in the circumferential direction; and
a roller thrust bearing which restrains a movement of each of the plurality of planetary rollers in the axial direction, wherein
the ring member is in contact with the plurality of planetary rollers in a state of pressing the plurality of planetary rollers inward in the radial direction so that the plurality of planetary rollers face the sun roller, and
the roller thrust bearing is a magnetic bearing.

2. The transmission according to claim 1, wherein each of the plurality of planetary rollers includes
a roller main body which is in sliding contact with the inner peripheral surface of the ring member and the outer peripheral surface of the sun roller, and
a supported roller which extends from the roller main body in the axial direction and is supported by the planetary roller supporting member.

3. The transmission according to claim 2, wherein the supported roller extends to both sides in the axial direction with respect to the roller main body.

4. The transmission according to claim 1, wherein the planetary roller supporting member includes
a support pad which is accommodated inside the ring member and rotatably supports each of the plurality of planetary rollers around the roller axis, and a pad support member which is fixed to the housing and restrains a movement of the support pad in the circumferential direction.

5. The transmission according to claim 4, wherein the support pad is disposed only in front of each of the plurality of planetary rollers in a rotational direction of a shaft serving as an input shaft out of the first shaft and the second shaft.

6. A compressor system comprising:
a compressor;
a driving machine which drives the compressor; and
a transmission according to claim 1 which is disposed between the compressor and the driving machine.

* * * * *